United States Patent [19]
Kim et al.

[11] Patent Number: 5,867,146
[45] Date of Patent: Feb. 2, 1999

[54] THREE DIMENSIONAL WIRELESS POINTING DEVICE

[75] Inventors: Jeong Yeol Kim, Kyungki-do; Duk Chin Chwa, Seoul, both of Rep. of Korea

[73] Assignee: LG Electronics Inc., Seoul, Rep. of Korea

[21] Appl. No.: 781,321

[22] Filed: Jan. 10, 1997

[30] Foreign Application Priority Data

Jan. 17, 1996 [KR] Rep. of Korea ............ 1996/882
Jan. 17, 1996 [KR] Rep. of Korea ............ 1996/883

[51] Int. Cl.[6] .................................. G09G 5/08
[52] U.S. Cl. .......................... 345/158; 345/169; 341/22; 356/141.5; 367/129; 367/907
[58] Field of Search ........................... 345/158, 163, 345/157, 156, 161, 168, 169; 341/20, 22; 356/141.5; 367/907, 129

[56] References Cited

U.S. PATENT DOCUMENTS

| | | | |
|---|---|---|---|
| 4,578,674 | 3/1986 | Baker et al. | 345/158 |
| 5,142,506 | 8/1992 | Edwards | 367/129 |
| 5,144,594 | 9/1992 | Gilchrist | 367/129 |
| 5,703,623 | 12/1997 | Hall et al. | 345/158 |
| 5,710,623 | 1/1998 | Kim | 345/158 |

*Primary Examiner*—Daniel J. Wu
*Attorney, Agent, or Firm*—Loeb & Loeb LLP

[57] ABSTRACT

Three dimensional wireless pointing device for calculating coordinates and controlling a position of a cursor in a three dimensional space is disclosed, including a transmission side having a plurality of ultrasonic wave generating parts and a single infrared ray emitting part or a single ultrasonic wave generating part and a plurality of infrared ray emitting parts arranged in a certain axis direction at certain angles and a reception side having a plurality of infrared ray receiving sensors and a single ultrasonic wave receiving sensor arranged to cross the ultrasonic wave generating part(s) and the infrared ray emitting part(s) in the transmission side at a right angle, thereby to measure intensities of the infrared ray(s) and the ultrasonic wave(s) varied depending on direction of pointing and calculate a difference of relative traveling time periods of the infrared ray and the ultrasonic wave to obtain coordinate values of a position in a three dimensional space, whereby a position of cursor or menu, which is a control objective, can be controlled using the obtained coordinate values.

22 Claims, 7 Drawing Sheets

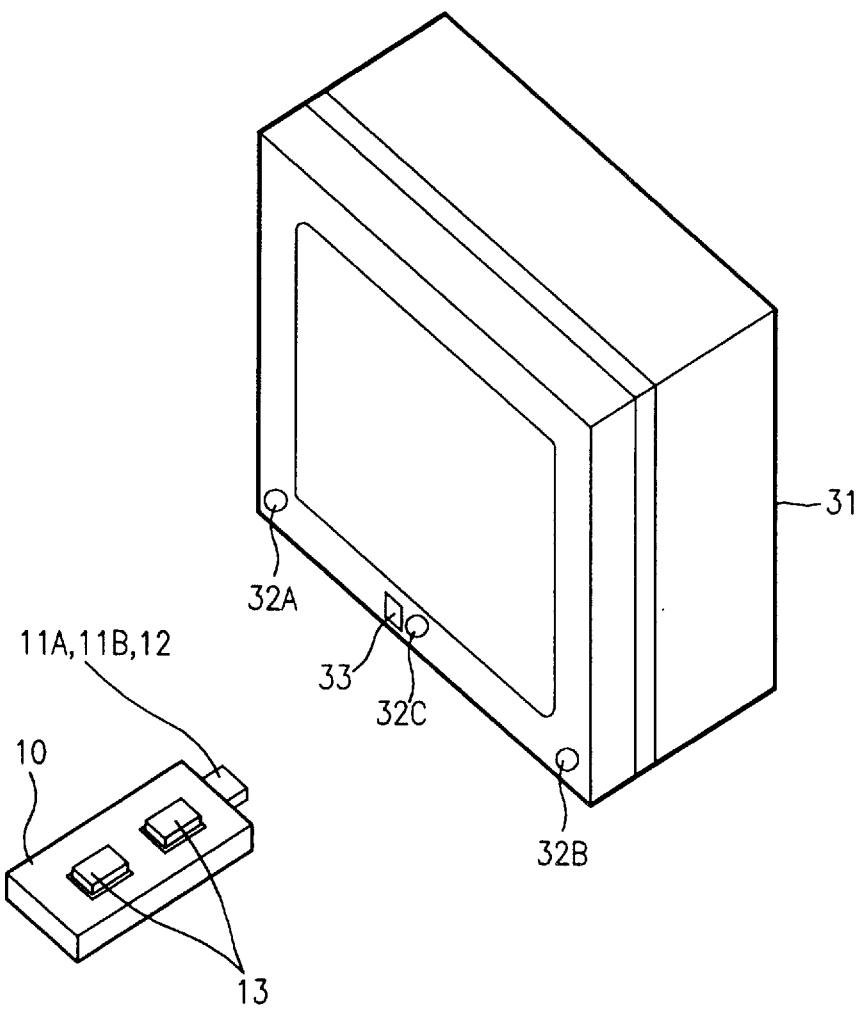
FIG.1
FIG.2a FIG.2b
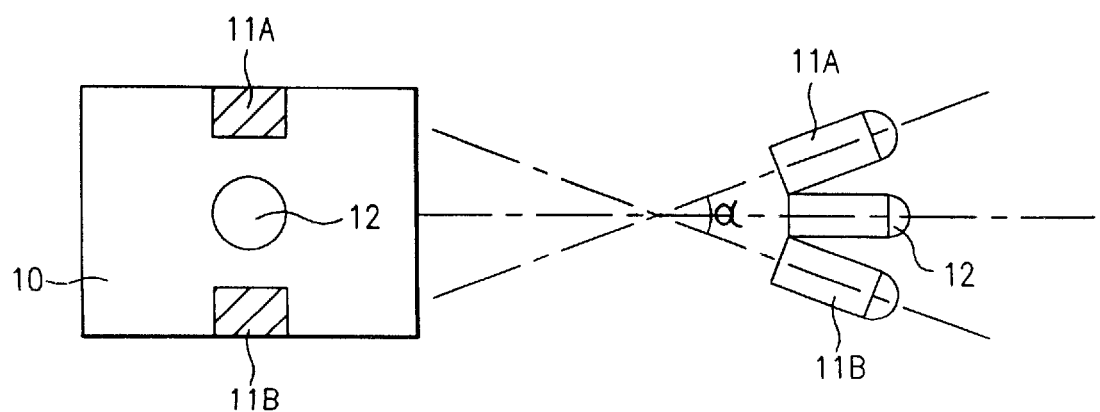

THREE DIMENSIONAL WIRELESS POINTING DEVICE

BACKGROUND OF THE INVENTION

1. Field of the Invention

The present invention relates to a three dimensional wireless pointing device which can calculate coordinates and control a position of a cursor in a three dimensional space.

2. Discussion of the Related Art

In the wireless pointing devices, there are in general an ultrasonic wireless pointing device in which a plurality of ultrasonic generating parts and ultrasonic receiving sensors are arranged to cross each other at a right angle for using a relative phase difference of the ultrasonic signals caused depending on a direction of pointing in calculating coordinates of a pointed position, and infrared wireless pointing device in which a plurality of infrared emitting parts and infrared receiving sensors are arranged to cross each other at a right angle for using a relative intensity difference of infrared signals caused depending on a direction of pointing in calculating coordinates of the pointed position. The ultrasonic wireless pointing device was filed by the same applicant (U.S. Ser. No. 580,757/08), and the infrared wireless pointing device was also filed by the same applicant (U.S. patent Ser. No. 679,644/08).

However, the ultrasonic or infrared wireless pointing device, which is pointing devices for calculating coordinates of a position on a two dimensional plane and controlling a position of a cursor, has a problem that the pointing device can not point a three dimensional spatial position on a display space of a three dimensional display, such as a hologram.

SUMMARY OF THE INVENTION

Accordingly, the present invention is directed to a three dimensional wireless pointing device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the three dimensional wireless pointing device includes position pointing means having an infrared ray emitting part and a plurality of ultrasonic wave generating parts arranged in a predetermined axis direction at predetermined angles for emitting an infrared ray and generating a plurality of ultrasonic waves of different characteristics into a space, detecting means having an ultrasonic wave receiving sensor and a plurality of infrared ray receiving sensors mounted on different positions on a straight line on a body of an electronic appliance to cross at a right angle to the infrared ray emitting part and the plurality of ultrasonic wave generating parts on the position pointing means for receiving the ultrasonic waves and the infrared signal transmitted from the position pointing means, spatial position analyzing means for digitizing a plurality of infrared signals detected in the detecting means and detecting a relative phase difference of the ultrasonic waves with reference to a time when the infrared rays are detected, coordinate calculating means for measuring intensities of the plurality of detected infrared rays digitized in the spatial position analyzing means in obtaining a first coordinate value, measuring intensities of the plurality of ultrasonic waves of different characteristics received at the ultrasonic wave receiving sensor with reference to the time when the infrared rays are detected by the infrared ray receiving sensors in obtaining a second coordinate value, and calculating an average traveling time of the ultrasonic waves with reference to the time when the infrared rays are detected by the infrared ray receiving sensors in obtaining a third coordinate value, thereby to determine a three dimensional relative position between the position pointing means and the detecting means, and a position controlling means for taking the three dimensional position determined by the coordinate calculating means as the present position caused by a position movement of the position pointing means relative to the detecting means.

In another aspect of the present invention, there is provided a three dimensional wireless pointing device, including position pointing means having an ultrasonic wave generating part and a plurality of infrared ray emitting parts arranged in a predetermined axis direction at predetermined angle for generating an ultrasonic wave signal and emitting a plurality of infrared ray signals of different characteristics into a space, detecting means having an ultrasonic wave receiving sensor and a plurality of infrared ray receiving sensors mounted on a body of an electronic appliance at different positions on a straight line to cross at a right angle to the ultrasonic wave generating part and the plurality of infrared ray emitting parts in the position pointing means for receiving the ultrasonic wave signal and the infrared ray signals transmitted from the position pointing means, spatial position analyzing means for digitizing the plurality of infrared signals detected in the detecting means and detecting a phase of the ultrasonic wave signal with reference to a time when the infrared rays are detected, coordinate calculating means for measuring detected intensities of the plurality of infrared rays digitized in the spatial position analyzing means in obtaining a first coordinate value, measuring detected intensities of the plurality of infrared signals of different characteristics received at one of the plurality of infrared ray receiving sensors in obtaining a second coordinate value, and calculating an average traveling time of the ultrasonic waves with reference to the time when the infrared rays are detected by the infrared ray receiving sensors in obtaining a third coordinate value, thereby to determine a three dimensional relative position between the position pointing means and the detecting means, and a position controlling means for taking the three dimensional position determined by the coordinate calculating means as the present position caused by a position movement of the position pointing means relative to the detecting means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 1 illustrates a perspective view of a three dimensional wireless pointing device in accordance with a first embodiment of the present invention;

FIG. 2a illustrates a front view of an arrangement of the ultrasonic wave generating parts and the infrared ray emitting part in the position pointing means shown in FIG. 1;

FIG. 2b illustrates a side view of the arrangement of the ultrasonic wave generating parts and the infrared ray emitting part in the position pointing means shown in FIG. 1;

DETAILED DESCRIPTION OF THE PREFERRED EMBODIMENTS

Reference will now be made in detail to the preferred embodiments of the present invention, examples of which are illustrated in the accompanying drawings.

A three dimensional wireless pointing device of the present invention comprises at large an electronic appliance, which is an objective of pointing, and a position pointing means for pointing the objective. The electronic appliance is a general term for the electronic appliances, such as display, for example, television and monitor, microcomputer, word processor, work station, robot, and peripherals of a large sized computer. In explanation of the present invention, the display will be explained, as an example. And, the position pointing means may be a remote controller, a ring on a finger, mouse and stylus pen, and transmit a signal to the electronic appliance with or without a line.

First Embodiment

FIG. 1 illustrates a perspective view of a three dimensional wireless pointing device in accordance with a first embodiment of the present invention, wherein a display 31 is shown which has infrared ray receiving sensors 32A and 32B mounted on a lower(or upper) part of the display 31 at both ends thereof spaced a predetermined distance apart in an X-axis direction, and an infrared ray receiving sensor 32c and an ultrasonic wave receiving sensor 33 mounted at the center of the lower part.

Figure 3A:
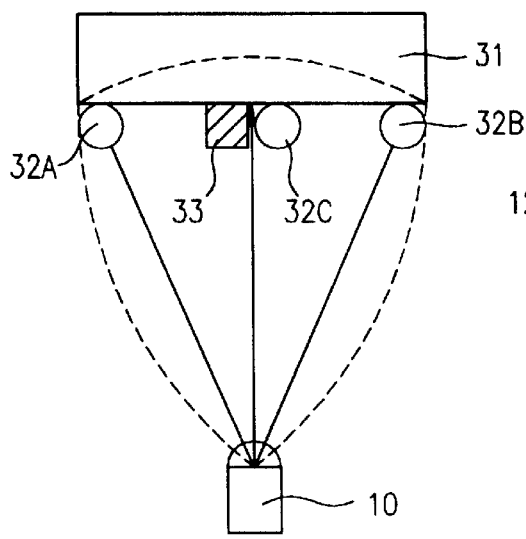
FIG. 3a illustrates a plan view of a beam distribution of the ultrasonic wave generating parts and the infrared ray emitting part in the position pointing means shown in FIG. 1.
Figure 3B:
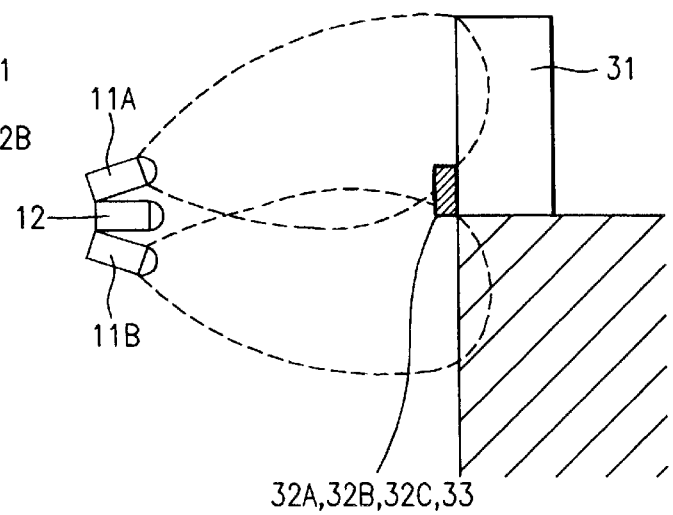
FIG. 3b illustrates a side view of the beam distribution of the ultrasonic wave generating parts and the infrared ray emitting part in the position pointing means shown in FIG. 1.

FIGS. 2a and 2b illustrate front, and side views of an arrangement of the ultrasonic wave generating parts (transducers) 11A and 11B and the infrared ray emitting part 12 in the position pointing means shown in FIG. 1, wherein it can be seen that each of the ultrasonic wave generating parts 11A and 11B are arranged in a Y-axis direction with an angle α between them and the infrared ray emitting part 12 arranged between the ultrasonic wave generating parts 11A and 11B. The position pointing means and the receiving means are arranged so that their directions of axes are orthogonal to each other. FIGS. 3a and 3b illustrate plan, and side views of a beam distribution of the ultrasonic wave generating parts and the infrared ray emitting part in the position pointing means shown in FIG. 1.

Figure 4:
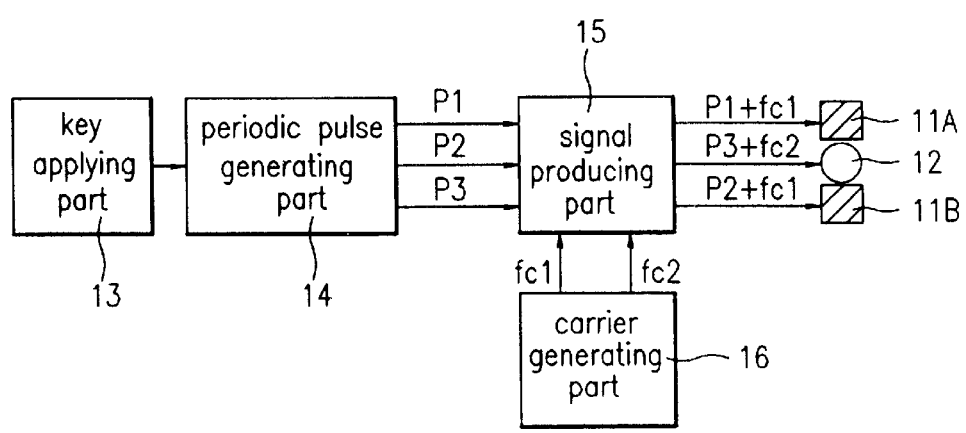
FIG. 4 illustrates a block diagram of position pointing means in a three dimensional wireless pointing device in accordance with the first embodiment of the present invention.

FIG. 4 illustrates a block diagram of the position pointing means in a three dimensional wireless pointing device in accordance with the first embodiment of the present invention.

Referring to FIG. 4, the position pointing means in a three dimensional wireless pointing device in accordance with the first embodiment of the present invention includes a key applying part 13 having keys for moving a cursor, selection orders and operation orders, a periodic pulse generating part 14 for receiving a key signal from the key applying part 13 in generation of periodic pulses of a code identifying waveform and a synchronization identifying waveform, a signal producing part 15 for converting the periodic pulse signal generated in the periodic pulse generating part 14 into ultrasonic waves P1 and P2 and an infrared ray signal P3 of different characteristics and overlapping with carrier signals fc1 and fc2, a carrier generating part 16 for generating an ultrasonic carrier signal fc1 and an infrared carrier signal fc2 and applying to the signal producing part 15 for preventing disturbance or interference of the ultrasonic waves and the infrared signal during transmission, and a plurality of signal generating parts of ultrasonic wave generating parts 11A and 11B and an infrared ray emitting part 12 for transmitting the ultrasonic waves P1+fc1 and P2+fc2 and the infrared signal P3+fc2 from the signal producing part 15 into a space. The ultrasonic wave generating parts 11A and 11B and the infrared ray emitting part 12 of the plurality of signal generating parts are arranged in an Y-axis direction at a predetermined angle α.

Figure 5:
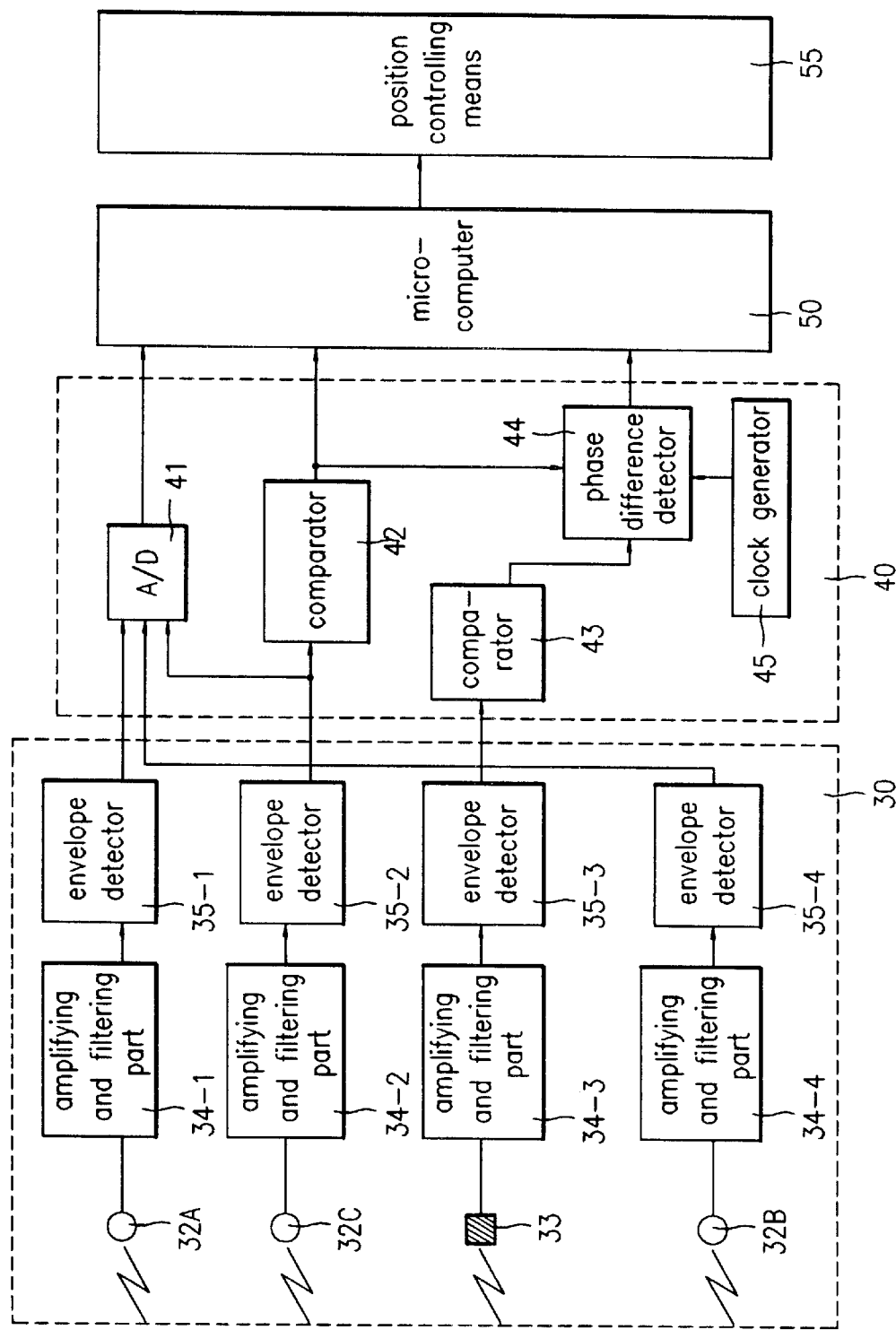
FIG. 5 illustrates a block diagram of signal receiving means in a three dimensional wireless pointing device in accordance with the first embodiment of the present invention.

FIG. 5 illustrates a block diagram of signal receiving means in a three dimensional wireless pointing device in accordance with the first embodiment of the present invention.

Referring to FIG. 5, the signal receiving means in a three dimensional wireless pointing device in accordance with the first embodiment of the present invention includes detection means 30 for detecting the ultrasonic waves and the infrared rays received at the infrared ray receiving sensors 32A, 32B and 32C and the ultrasonic wave receiving sensor 33 mounted on the display 31 spaced predetermined distances apart in the X-axis direction crossed at a right angle to the ultrasonic wave generating parts 11A and 11B and the infrared ray emitting part 12 in the position pointing means 10, spatial position analyzing means 40 for digitizing the infrared signals detected by the detecting means 30 and detecting relative phase differences of the ultrasonic waves with reference to the time when the infrared signals are detected, a microcomputer 50 for using intensities of the infrared signals digitized in the spatial position analyzing means 40 and phases of the ultrasonic wave signals in obtaining X, Y, Z coordinates of a position for determining a relative three dimensional position between the position pointing means 10 and the detecting means 30, and position controlling means 60 for taking the three dimensional position determined by the microcomputer 50 as the present position caused by a relative movement of the position pointing means to the detecting means 30 in controlling a control objective, such as a cursor or a menu.

The detecting means 30 includes the infrared ray receiving sensors 32A, 32B and 32C each for receiving the infrared ray transmitted from the position pointing means 10, amplifying and filtering parts 34-1, 34-2 and 34-4 for amplifying the weak infrared signal received at the infrared ray receiving sensors 32A, 32B and 32C respectively and passing the infrared signals of a carrier frequency band, envelope detectors 35-1, 35-2 and 35-4 for removing carrier signals from the infrared signals from the amplifying and filtering parts 34-1, 34-2 and 34-4 to detect intensity levels of lights received at the infrared ray receiving sensors 32A, 32B and 32C respectively, the ultrasonic wave receiving sensor 33 for receiving the ultrasonic wave signal transmitted from the position pointing means 10, an amplifying and filtering part 34-3 for amplifying the weak ultrasonic wave signal received at the ultrasonic wave receiving sensor 33 and passing the ultrasonic wave signal of the carrier frequency band, an envelope detector 35-3 for removing carrier signal from the ultrasonic wave signal from the amplifying and filtering parts 34-3 to detect an intensity level of the ultrasonic wave received at the ultrasonic wave receiving sensor 33.

The spatial position analyzing means 40 includes an ADC(Analog/Digital Converter) 41 for converting outputs from the infrared envelope detectors 35-1, 35-2 and 35-4, a comparator 42 for comparing the infrared ray signal from the envelope detector 35-2 with an internal reference signal to convert into a rectangular wave, i.e., a timing signal for using as a reference signal in coordinate calculation and code analyzing, a comparator 43 for comparing the ultrasonic wave signal from the ultrasonic envelope detector 35-3 with an internal reference signal to convert into a timing signal, a phase difference detector 44 for detecting a relative phase difference of the ultrasonic wave signal from the comparator 43 with reference to a time when the infrared ray from the comparator 42 is detected, and a clock generator 45 for generating and applying clocks to the phase difference detector 44.

In the three dimensional wireless pointing device in accordance with the first embodiment of the present invention having the aforementioned system, upon reception of a key signal of various key signals(for example, keys for a cursor movement, selection orders, operation order, and etc.) through the key applying part 13 on the position pointing means 10, the periodic pulse generating part 14 generates periodic pulses of a code identifying waveform according to the applied key signal and, in addition, generates periodic pulses of a synchronization identifying waveform for a key signal of cursor moving order, converts ultrasonic wave signals P1 and P2 of different characteristics and an infrared ray signal P3, and applies to the signal producing part 15. In this instant, the carrier generating part 16 generates and applies an ultrasonic carrier signal fc1 and an infrared carrier signal fc2 to the signal producing part 15 for preventing disturbance or interference of the ultrasonic waves and the infrared ray signal during transmission.

The signal producing part 15 overlaps the ultrasonic carrier signal fc1 and an infrared carrier signal fc2 from the carrier generating part 16 with the ultrasonic wave signals P1 and P2 of different characteristics and the infrared ray signal P3 from the periodic pulse generating part 14, and transmits the overlapped ultrasonic waves P1+fc1 and P2+fc1 and infrared ray P3+fc2 into a space through the ultrasonic wave generating part 11A and 11B and the infrared ray emitting part 12, respectively. In this instant, the periodic pulse signal generated in the periodic pulse generating part 14 is loaded on the infrared signals in most cases. The distribution of the ultrasonic waves and the infrared ray transmitted in the space through the ultrasonic wave generating part 11A and 11B and the infrared ray emitting part 12 respectively is as shown in FIGS. 3a and 3b.

The infrared ray receiving sensors 32A, 32B and 32C in the detecting means 30, attached on both ends and center in an X-axis direction spaced predetermined distances apart at a lower part of the display 31, receive the infrared ray transmitted from the position pointing means 10, and apply to the amplifying and filtering parts 34-1, 34-2 and 34-4 connected to the infrared ray receiving sensors 32A, 32B and 32C, respectively. And, the ultrasonic wave receiving sensor 33, attached on the lower part of the display 31 in the X-axis direction spaced a predetermined distance apart from the infrared ray receiving sensor 32C attached on the center of the display 31, receives the ultrasonic wave signal transmitted from the position pointing means 10, and applies to the amplifying and filtering part 34-3.

Accordingly, the amplifying and filtering part 34-1 amplifies the infrared signal received at the infrared ray receiving sensor 32A and only produces its carrier frequency band to the envelope detector 35-1, and the envelope detector 35-1 removes a carrier frequency from the output of the amplifying and filtering part 34-1 to detect a level of the light intensity received at the infrared ray receiving sensor 32A. The amplifying and filtering part 34-2 amplifies the infrared signal received at the infrared ray receiving sensor 32C and only produces its carrier frequency band to the envelope detector 35-2, and the envelope detector 35-2 removes a carrier frequency from the output of the amplifying and filtering part 34-2 to detect a level of the light intensity received at the infrared ray receiving sensor 32C. The amplifying and filtering part 34-3 amplifies the ultrasonic wave signal received at the ultrasonic wave receiving sensor 33 and produces only its carrier frequency band to the envelope detector 35-3, and the envelope detector 35-3 removes a carrier frequency from the output of the amplifying and filtering part 34-3 to detect a level of the acoustic intensity received at the ultrasonic wave receiving sensor 33. And, the amplifying and filtering part 34-4 amplifies the infrared signal received at the infrared ray receiving sensor 32B and only produces its carrier frequency band to the envelope detector 35-4, and the envelope detector 35-4 removes a carrier frequency from the output of the amplifying and filtering part 34-4 to detect a level of the light intensity received at the infrared ray receiving sensor 32B.

The outputs from the infrared envelope detectors 35-1, 35-2 and 35-4 are applied to the ADC 41, digitized into corresponding digital signals, and applied to the microcomputer 50. And, the output from the infrared ray envelope detector 35-2 is compared with an internal reference signal in the comparator 42, and converted into a timing signal with which an analysis of time intervals is possible, for using as a reference in code analysis and coordinate calculation. And, the output from the ultrasonic wave envelope detector 35-3 is compared with an internal reference signal in the comparator 43, and converted into a timing signal corresponding to the output. In this instant, the output from the comparator 42 is applied to the microcomputer 50 for analyzing a code as well as to the phase difference detector 44 for coordinate calculation. The phase difference detector 44 detects a phase difference of the ultrasonic wave signal from the comparator 43 with reference to the infrared ray signal from the comparator 42 and applies to the microcomputer 50.

The microcomputer 50 uses the time intervals in the timing signal from the comparator 42 in analyzing a code identifying waveform and a synchronization identifying waveform, conducts a general process if the identified code is a command code not requiring a movement of the cursor, and calculates X-, Y-, Z-axis coordinates of the data from the spatial position analyzing means 40 if the identified code is a command code for a movement of the cursor. Therefore, if the identified code is a command code for a movement of the cursor, as intensity levels of the infrared ray from the infrared ray emitting part 12 at the infrared ray receiving sensors 32A and 32B will show a relative difference depending on X-axis angles between the infrared ray signal and the infrared ray receiving sensors 32A and 32B, the microcomputer 50 uses this phenomenon in calculating the X-axis coordinate. That is, when the infrared ray is transmitted through the position pointing means 10, the microcomputer 50 calculates intensity level difference(s) of the infrared ray detected at the infrared ray receiving sensors 32A and 32B or the infrared ray receiving sensors 32A, 32B and 32C, to obtain the X-coordinate.

And, since intensity levels of the ultrasonic waves from the ultrasonic wave generating parts 11A and 11B received at the ultrasonic wave receiving sensor 33 will show a relative difference depending on Y-axis angles between the ultrasonic waves and the ultrasonic wave receiving sensor 33, the microcomputer 50 uses this phenomenon in calculating the Y-axis coordinate. That is, with reference to a detecting time of the infrared ray signal from the comparator 42, a traveling time difference of the ultrasonic wave from the ultrasonic wave generating part 11A to the ultrasonic wave receiving sensor 33 and a traveling time difference of the ultrasonic wave from the ultrasonic wave generating part 11B to the ultrasonic wave receiving sensor 33 are obtained, and a relative difference of the two time differences is obtained again in calculating the Y-axis coordinate. This is possible because the infrared ray is a light and the ultrasonic waves are acoustic wave, which causes the traveling time of the infrared ray to the receiving means is shorter than the traveling time of the ultrasonic waves to the receiving means.

And, with reference to a detecting time of the infrared ray signal from the comparator 42, a traveling time difference of the ultrasonic wave from the ultrasonic wave generating part 11A to the ultrasonic wave receiving sensor 33 and a traveling time difference of the ultrasonic wave from the ultrasonic wave generating part 11B to the ultrasonic wave receiving sensor 33 are obtained, and an average of the two time differences is taken in obtaining the Z-axis coordinate.

Thus, the microcomputer 50 obtains the X-, Y-, Z-axis coordinates to determine the three dimensional relative position difference between the position pointing means 10 and the detecting means 30, and the position controlling means 55 takes the three dimensional position determined by the microcomputer 50 as the present cursor position according to the relative position movement between the position pointing means 10 and the detecting means 30, and moves the cursor to the three dimensional position.

In the meantime, the position pointing means 10 may be adopted to transmit ultrasonic waves of the same carrier frequency in different timings, or ultrasonic waves of carrier frequencies different from each other on the same time.

Second Embodiment

Figure 6:
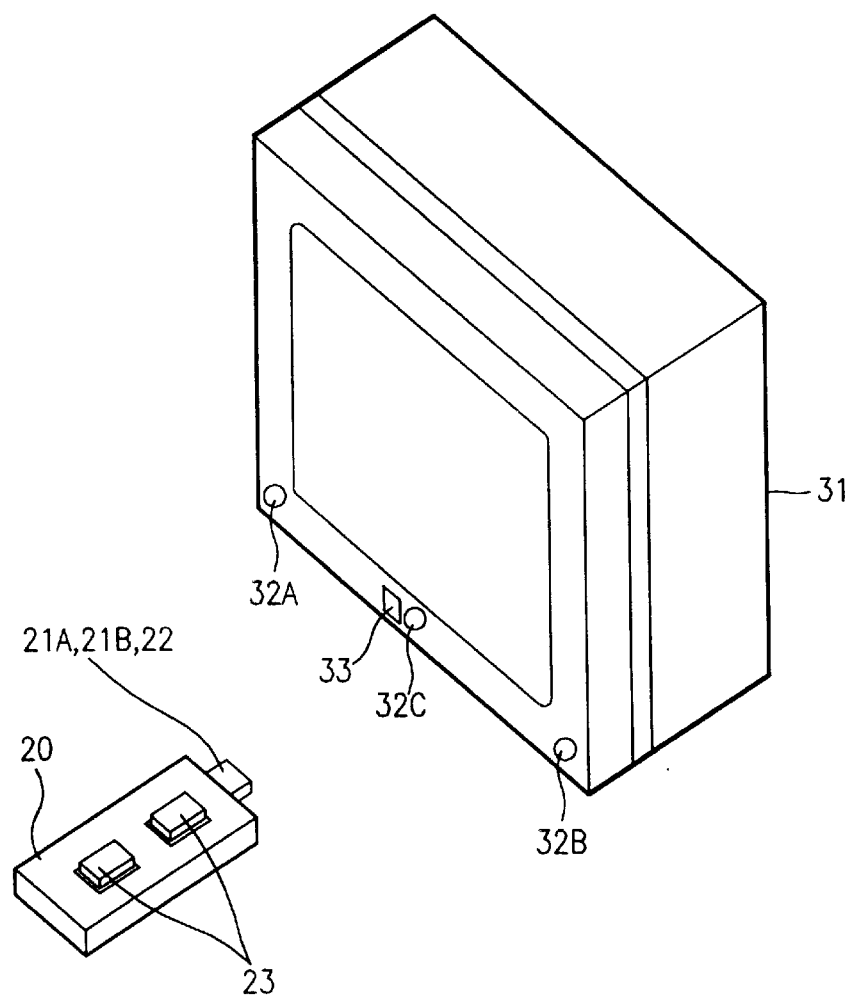
FIG. 6 illustrates a perspective view of a three dimensional wireless pointing device in accordance with a second embodiment of the present invention.
Figures 7A, 7B:
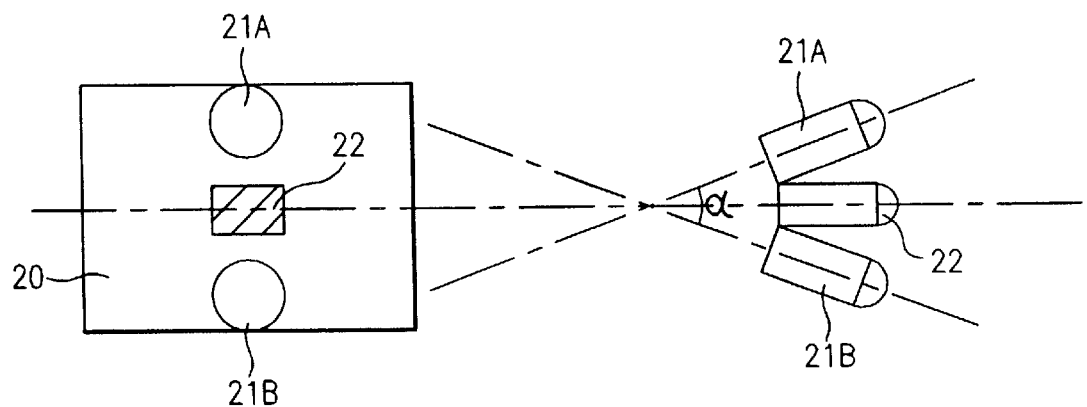
FIG. 7a illustrates a front view of an arrangement of the infrared ray emitting parts and the ultrasonic wave generating part in the position pointing means shown in FIG. 6.
FIG. 7b illustrates a side view of the arrangement of the infrared ray emitting parts and the ultrasonic wave generating part in the position pointing means shown in FIG. 6.
Figure 8A:
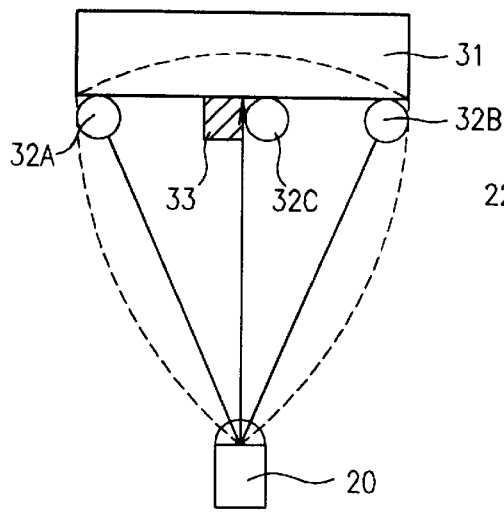
FIG. 8a illustrates a plan view of a beam distribution of the infrared ray emitting parts and the ultrasonic wave generating part in the position pointing means shown in FIG. 6.
Figure 8B:
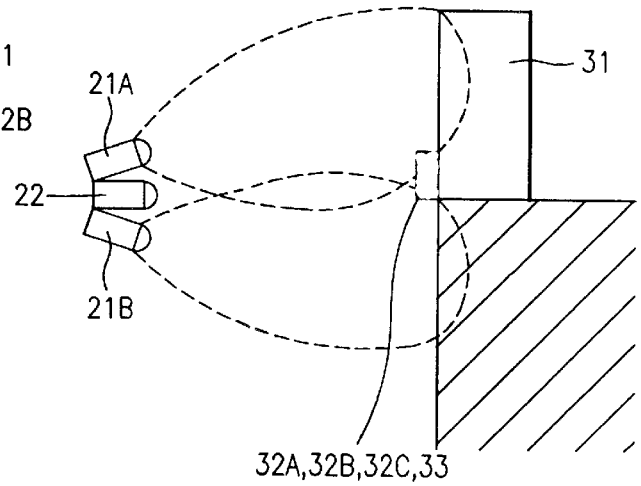
FIG. 8b illustrates a side view of the beam distribution of the infrared ray emitting parts and the ultrasonic wave generating part in the position pointing means shown in FIG. 6.

FIG. 6 illustrates a perspective view of a three dimensional wireless pointing device in accordance with a second embodiment of the present invention, of which position pointing means is different from that of the first embodiment, but receiving means is identical to that of the first embodiment. That is, the receiving means includes infrared ray receiving sensors 32A and 32B attached on both ends of a lower part(or an upper part) of the display 31 spaced a predetermined distance apart in an X-axis direction, and an infrared ray receiving sensor 32C and an ultrasonic wave receiving sensor 33 attached on a center thereof FIGS. 7a~7b illustrate front, and side views of an arrangement of the infrared ray emitting parts 21A and 21B and the ultrasonic wave generating part 22 in the position pointing means 20 shown in FIG. 6, wherein it can be seen that the infrared ray emitting parts 21A and 21B are arranged in an Y-axis direction with an angle α between them, and the ultrasonic wave generating part 22 arranged between the infrared ray emitting parts 21A and 21B. The arranged directions of axes of the position pointing means and the receiving means are orthogonal to each other. FIGS. 8a~8b illustrate plan, and side views of a beam distribution of the infrared ray emitting parts and the ultrasonic wave generating part in the position pointing means shown in FIG. 6.

Figure 9:
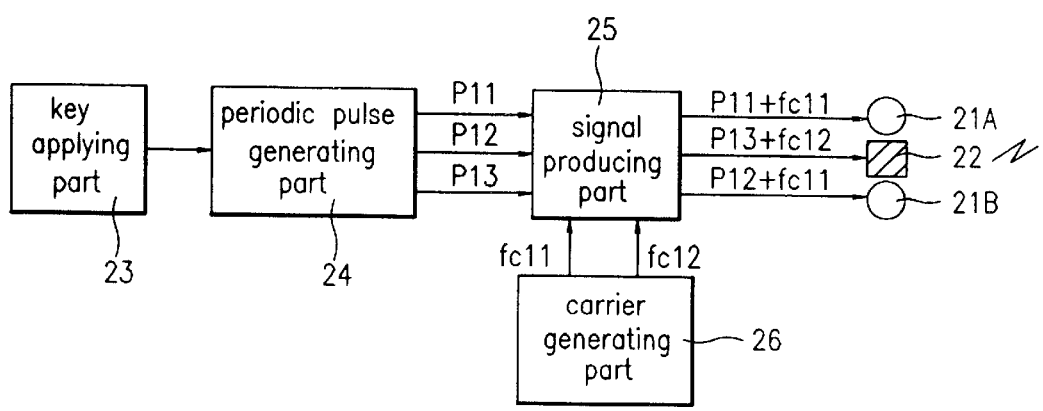
FIG. 9 illustrates a block diagram of position pointing means in a three dimensional wireless pointing device in accordance with the second embodiment of the present invention.

FIG. 9 illustrates a block diagram of the position pointing means 20 in the three dimensional wireless pointing device in accordance with the second embodiment of the present invention.

Referring to FIG. 9, the position pointing means 20 in the three dimensional wireless pointing device in accordance with the second embodiment of the present invention includes a key applying part 23 having keys for moving a cursor, selection orders and operation orders, a periodic pulse generating part 24 for receiving a key signal from the key applying part 23 in generation of periodic pulses of a code identifying waveform and a synchronization identifying waveform, a signal producing part 25 for converting the periodic pulse signal generated in the periodic pulse generating part 24 into infrared ray signals P11 and P12 and an ultrasonic wave P13 of different characteristics and overlapping with carrier signals fc11 and fc12, a carrier generating part 26 for generating an infrared carrier signal fc11 and an ultrasonic carrier signal fc12 and applying to the signal producing part 25 for preventing disturbance or interference of the infrared signals and the ultrasonic wave during transmission, and a plurality of signal generating parts of infrared ray emitting parts 21A and 21B and an ultrasonic wave generating part 22 for transmitting the infrared signal P11+fc11 and P12+fc11 and the ultrasonic waves P13+fc12 from the signal producing part 25 into a space. The infrared ray emitting parts 21A and 21B and the ultrasonic wave generating part 22 of the plurality of signal generating parts are arranged in the Y-axis direction at a predetermined angle α.

In the meantime, a system of the receiving means of the second embodiment is not shown because the system is identical to that of the first embodiment. However, as the spatial position analyzing method of the receiving means of the second embodiment is different from the receiving means of the first embodiment due to the difference of the position pointing means of the second embodiment from that of the first embodiment, the system of the position pointing means of the second embodiment will be explained with reference to FIG. 5.

Referring to FIG. 5, the signal receiving means in the three dimensional wireless pointing device in accordance with the second embodiment of the present invention includes detection means 30 for detecting the ultrasonic wave and the infrared rays received at a plurality of infrared ray receiving sensors 32A, 32B and 32C and the ultrasonic wave receiving sensor 33 mounted on the display 31 spaced predetermined distances apart in the X-axis direction crossed at a right angle to a plurality of the infrared ray emitting parts 21A and 211B and the ultrasonic wave generating part 22 in the position pointing means 20, spatial position analyzing means 40 for digitizing the infrared signals detected by the detecting means 30 and detecting a phase difference of the ultrasonic waves with reference to the time when the infrared signals are detected, a microcomputer 50 for using intensities of the infrared signals digitized in the spatial position analyzing means 40 and phases of the ultrasonic wave signals in obtaining X, Y, Z coordinates of a position for determining a relative three dimensional position between the position pointing means 20 and the detecting means 30, and position controlling means 55 for taking the three dimensional position determined by the microcomputer 50 as the present position caused by a relative movement of the position pointing means 20 to the detecting means 30 in controlling a control objective, such as a cursor or a menu.

The detecting means 30 includes the plurality of infrared ray receiving sensors 32A, 32B and 32C each for receiving the infrared rays transmitted from the position pointing means 20, amplifying and filtering parts 34-1, 34-2 and 34-4 for amplifying the weak infrared signals received at the infrared ray receiving sensors 32A, 32B and 32C respectively and passing the infrared signals of a carrier frequency band, envelope detectors 35-1, 35-2 and 35-4 for removing carrier signals from the infrared signals from the amplifying and filtering parts 34-1, 34-2 and 34-4 to detect intensity levels of lights received at the infrared ray receiving sensors 32A, 32B and 32C respectively, the ultrasonic wave receiving sensor 33 for receiving the ultrasonic wave signals transmitted from the position pointing means 20, an amplifying and filtering part 34-3 for amplifying the weak ultrasonic wave signal received at the ultrasonic wave receiving sensor 33 and passing the ultrasonic wave signal of the carrier frequency band, an envelope detector 35-3 for removing a carrier signal from the ultrasonic wave signal from the amplifying and filtering parts 34-3 to detect an intensity level of the ultrasonic wave received at the ultrasonic wave receiving sensor 33.

The spatial position analyzing means 40 includes an ADC(Analog/Digital Converter) 41 for converting outputs from the infrared envelope detectors 35-1, 35-2 and 35-4, a comparator 42 for comparing the infrared ray signal from the envelope detector 35-2 with an internal reference signal to convert into a rectangular wave, i.e., a timing signal for using as a reference signal in coordinate calculation, a comparator 43 for comparing the ultrasonic wave signal from the ultrasonic envelope detector 35-3 with an internal reference signal to convert into a timing signal, a phase difference detector 44 for detecting a relative phase difference of the ultrasonic wave signal from the comparator 43 with reference to a time when the infrared ray from the comparator 42 is detected, and a clock generator 45 for generating and applying clocks to the phase difference detector 44.

In the three dimensional wireless pointing device in accordance with the second embodiment of the present invention having the aforementioned system, upon reception of a key signal of various key signals(for example, keys for a cursor movement, selection orders, operation order, and etc.) through the key applying part 23 on the position pointing means 20, the periodic pulse generating part 24 generates periodic pulses of a code identifying waveform according to the applied key signal and, in addition, generates periodic pulses of a synchronization identifying waveform for a key signal of cursor moving order, converts an infrared ray signals P11 and P12 and ultrasonic wave signal P13 of different characteristics, and applies to the signal producing part 25. In this instant, the carrier generating part 26 generates and applies an infrared carrier signal fc11 and an ultrasonic carrier signal fc12 to the signal producing part 25 for preventing disturbance or interference of the infrared ray signal and the ultrasonic waves during transmission.

The signal producing part 25 overlaps the infrared carrier signal fc11 and an ultrasonic carrier signal fc12 from the carrier generating part 26 with the infrared ray signals P11 and P12 of different characteristics and the ultrasonic wave signal P13 from the periodic pulse generating part 24, and transmits the overlapped infrared ray signals P11+fc11 and P12+fc11 and ultrasonic wave signal P13+fc12 into a space through the infrared ray emitting parts 21A and 21B and the ultrasonic wave generating part 22, respectively. In this instant, the periodic pulse signal generated in the periodic pulse generating part 24 is loaded on the infrared signals in most cases. The distribution of the ultrasonic waves and the infrared ray transmitted in the space through the ultrasonic wave generating part 21A and 21B and the infrared ray emitting part 22 respectively is as shown in FIGS. 8a and 8b.

The infrared ray receiving sensors 32A, 32B and 32C in the detecting means 30, attached on both ends and center in an X-axis direction spaced predetermined distances apart at a lower part of the display 31, receive the infrared ray signals transmitted from the position pointing means 20, and apply to the amplifying and filtering parts 34-1, 34-2 and 34-4 connected to the infrared ray receiving sensors 32A, 32B and 32C, respectively. In this instant, each of the plurality of infrared ray receiving sensors 32A, 32B and 32C receives the signal from the infrared ray emitting part 21A, and, after a predetermined time interval, receives the signal from the infrared ray emitting part 21B, again. And, the ultrasonic wave receiving sensor 33, attached on the lower part of the display 31 in the X-axis direction spaced a predetermined distance apart from the infrared ray receiving sensor 32C attached on the center of the display 31, receives the ultrasonic wave signal transmitted from the position pointing means 20, and applies to the amplifying and filtering part 34-3.

Accordingly, the amplifying and filtering part 34-1 amplifies the infrared signal received at the infrared ray receiving sensor 32A and only produces its carrier frequency band to the envelope detector 35-1, and the envelope detector 35-1 removes a carrier frequency from the output of the amplifying and filtering part 34-1 to detect a level of the light intensity received at the infrared ray receiving sensor 32A. The amplifying and filtering part 34-2 amplifies the infrared signal received at the infrared ray receiving sensor 32C and only produces its carrier frequency band to the envelope detector 35-2, and the envelope detector 35-2 removes a carrier frequency from the output of the amplifying and filtering part 34-2 to detect a level of the light intensity received at the infrared ray receiving sensor 32C. The amplifying and filtering part 34-3 amplifies the ultrasonic wave signal received at the ultrasonic wave receiving sensor 33 and produces only its carrier frequency band to the envelope detector 35-3, and the envelope detector 35-3 removes a carrier frequency from the output of the amplifying and filtering part 34-3 to detect a level of the acoustic intensity received at the ultrasonic wave receiving sensor 33. And, the amplifying and filtering part 34-4 amplifies the infrared signal received at the infrared ray receiving sensor 32B and only produces its carrier frequency band to the envelope detector 35-4, and the envelope detector 35-4 removes a carrier frequency from the output of the amplifying and filtering part 34-4 to detect a level of the light intensity received at the infrared ray receiving sensor 32B.

The outputs from the infrared envelope detectors 35-1, 35-2 and 35-4 are applied to the ADC 41 in the spatial position analyzing means 40, digitized into corresponding digital signals, and applied to the microcomputer 50. And, the output from the infrared ray envelope detector 35-2 is compared with an internal reference signal in the comparator 42, and converted into a timing signal with which an analysis of time intervals is possible, for using as a reference in code analysis and coordinate calculation. And, the output from the ultrasonic wave envelope detector 35-3 is compared with an internal reference signal in the comparator 43, and converted into a timing signal corresponding to the output. In this instant, the output from the comparator 42 is applied to the microcomputer 50 for analyzing a code as well as to the phase difference detector 44 for coordinate calculation. The phase difference detector 44 detects a phase difference of the ultrasonic wave signal from the comparator 43 with reference to the infrared ray signal from the comparator 42 and applies to the microcomputer 50.

The microcomputer 50 uses the time intervals in the timing signal from the comparator 42 in analyzing a code identifying waveform and a synchronization identifying waveform, conducts a general process if the identified code is a command code not requiring a movement of the cursor, and calculates X-, Y-, Z-axis coordinates of the data from the spatial position analyzing means 40 if the identified code is a command code for a movement of the cursor. Therefore, if the identified code is a command code for a movement of the cursor, as intensity levels of the infrared ray from the infrared ray emitting part 12 at the infrared ray receiving sensors 32A and 32B will show a relative difference depending on X-axis angles between the infrared ray signal and the infrared ray receiving sensors 32A and 32B, the microcomputer 50 uses this phenomenon in calculating the X-axis coordinate. That is, when the infrared ray is applied from the infrared ray emitting part 21A in the position pointing means 20 to the infrared ray receiving sensors 32A and 32B or the infrared ray receiving sensors 32A, 32B and 32C, the microcomputer 50 calculates intensity level difference(s) of the infrared rays detected at the infrared ray receiving sensors 32A and 32B or the infrared ray receiving sensors 32A, 32B and 32C, to obtain a first X-coordinate. And, when the infrared ray is applied from the infrared ray emitting part 21B in the position pointing means 20 to the infrared ray receiving sensors 32A and 32B or the infrared ray receiving sensors 32A, 32B and 32C after a predetermined time interval, the microcomputer 50 calculates intensity level difference(s) of the infrared rays detected at the infrared ray receiving sensors 32A and 32B or the infrared ray receiving sensors 32A, 32B and 32C, to obtain a second X-coordinate. Then, the first, and second coordinate values are averaged to obtain a final X-axis coordinate.

And, since intensity levels of the infrared rays from the infrared ray emitting parts 21A and 21B received at one of the plurality of infrared ray receiving sensors 32A, 32B and 32C will show a relative difference depending on Y-axis angles between the infrared rays and the one of the plurality of infrared ray receiving sensors 32A, 32B and 32C, the microcomputer 50 uses this phenomenon in calculating the Y-axis coordinate.

And, with reference to a detecting time of the infrared ray signal from the comparator 42, a traveling time difference of the ultrasonic wave from the ultrasonic wave generating part 21A to the ultrasonic wave receiving sensor 33 and a traveling time difference of the ultrasonic wave from the ultrasonic wave generating part 21B to the ultrasonic wave receiving sensor 33 are obtained, and an average of the two time differences is taken in obtaining the Z-axis coordinate. That is, a difference of the travel time of the infrared ray from the infrared ray emitting part 21A to one of the plurality of infrared ray receiving sensors 32A, 32B and 32C and the travel time of the ultrasonic wave from the ultrasonic wave generating part 22 to the ultrasonic wave receiving sensor 33 is calculated to obtain a first Z-axis coordinate, and a difference of the travel time of the infrared ray from the infrared ray emitting part 21B to one of the plurality of infrared ray receiving sensors 32A, 32B and 32C and the travel time of the ultrasonic wave from the ultrasonic wave generating part 22 to the ultrasonic wave receiving sensor 33 is calculated to obtain a second Z-axis coordinate. And the first, and second Z-axis coordinate values are averaged to obtain a final Z-axis coordinate value. This is possible because the infrared ray is a light and the ultrasonic waves are acoustic wave, which causes the traveling time of the infrared ray to the receiving means is shorter than the traveling time of the ultrasonic waves to the receiving means. In calculation of the Y- and Z-axis coordinates, only one of the plurality of infrared ray receiving sensors 32A, 32B and 32C is employed.

Thus, the microcomputer 50 obtains the X-, Y-, Z-axis coordinates to determine the three dimensional relative position difference between the position pointing means 20 and the detecting means 30, and the position controlling means 55 takes the three dimensional position determined by the microcomputer 50 as the present cursor position according to the relative position movement between the position pointing means 20 and the detecting means 30, and moves the cursor to the three dimensional position.

In the meantime, the position pointing means 20 may be adopted to transmit infrared signals of the same carrier frequency in different timings, or infrared rays of carrier frequencies different from each other on the same time. And, a polarizing filter may be attached on each of the infrared ray emitting parts and the infrared ray receiving sensors so that one of the infrared ray emitting parts transmits a longitudinal wave of the infrared ray and the other of the infrared ray emitting parts transmits a transverse wave of the infrared ray separately, or infrared ray emitting parts and infrared ray receiving sensors of different infrared ray lengths may be provided to transmit infrared rays of different wavelengths from each other.

Third Embodiment

Figure 10:
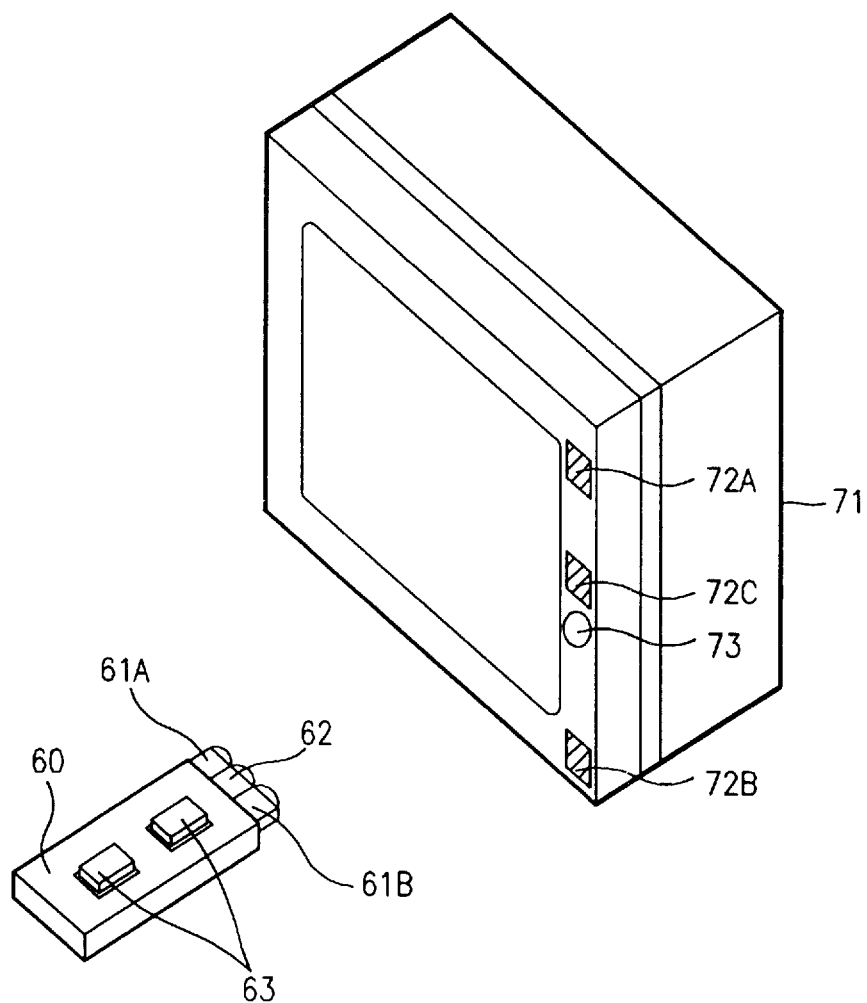
FIG. 10 illustrates a perspective view of a three dimensional wireless pointing device in accordance with a third embodiment of the present invention.

FIG. 10 illustrates a perspective view of a three dimensional wireless pointing device in accordance with a third embodiment of the present invention.

Referring to FIG. 10, the three dimensional wireless pointing device in accordance with a third embodiment of the present invention includes a position pointing means 60 having infrared ray emitting parts 61A and 61B arranged in an X-axis direction at a predetermined angle and an ultrasonic wave generating part 62 arranged between the infrared ray emitting parts 61A and 61B, for transmitting an ultrasonic wave and infrared ray signals of predetermined periods, and a receiving means having ultrasonic wave receiving sensors 72A and 72B arranged on upper, and lower ends of the left, or right side of a display 71 in an Y-axis direction spaced a predetermined distance apart, and an ultrasonic wave receiving sensor 72C and an infrared ray receiving sensor 73 arranged at the center thereof, for receiving the transmitted ultrasonic wave and the infrared rays. In this embodiment, coordinates of a pointed position are calculated opposite to the one explained in the first embodiment.

Fourth Embodiment

Figure 11:
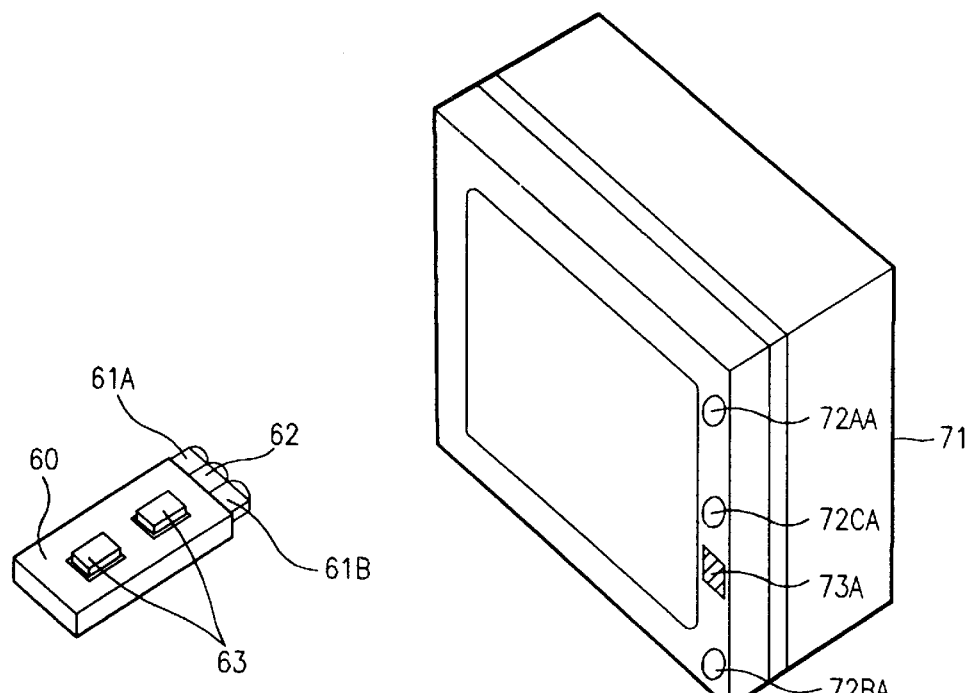
FIG. 11 illustrates a perspective view of a three dimensional wireless pointing device in accordance with a fourth embodiment of the present invention; and, FIG. 12 illustrates a perspective view of a three dimensional wireless pointing device in accordance with a fifth embodiment of the present invention.

FIG. 11 illustrates a perspective view of a three dimensional wireless pointing device in accordance with a fourth embodiment of the present invention.

Referring to FIG. 11, the three dimensional wireless pointing device in accordance with a third embodiment of the present invention includes a position pointing means 60 having infrared ray emitting parts 61A and 61B arranged in an X-axis direction at a predetermined angle and an ultrasonic wave generating part 62 arranged between the infrared ray emitting parts 61A and 61B, for transmitting an ultrasonic wave and infrared ray signals of predetermined periods, and a receiving means having infrared ray receiving sensors 72AA and 72BA arranged on upper, and lower ends of the left, or right side of a display 71 in an Y-axis direction spaced a predetermined distance apart, and an infrared ray receiving sensor 72CA and an ultrasonic wave receiving sensor 73A arranged at the center thereof, for receiving the transmitted ultrasonic wave and the infrared rays. In this embodiment, coordinates of a pointed position are calculated opposite to the one explained in the second embodiment.

Fifth Embodiment

Figure 12:
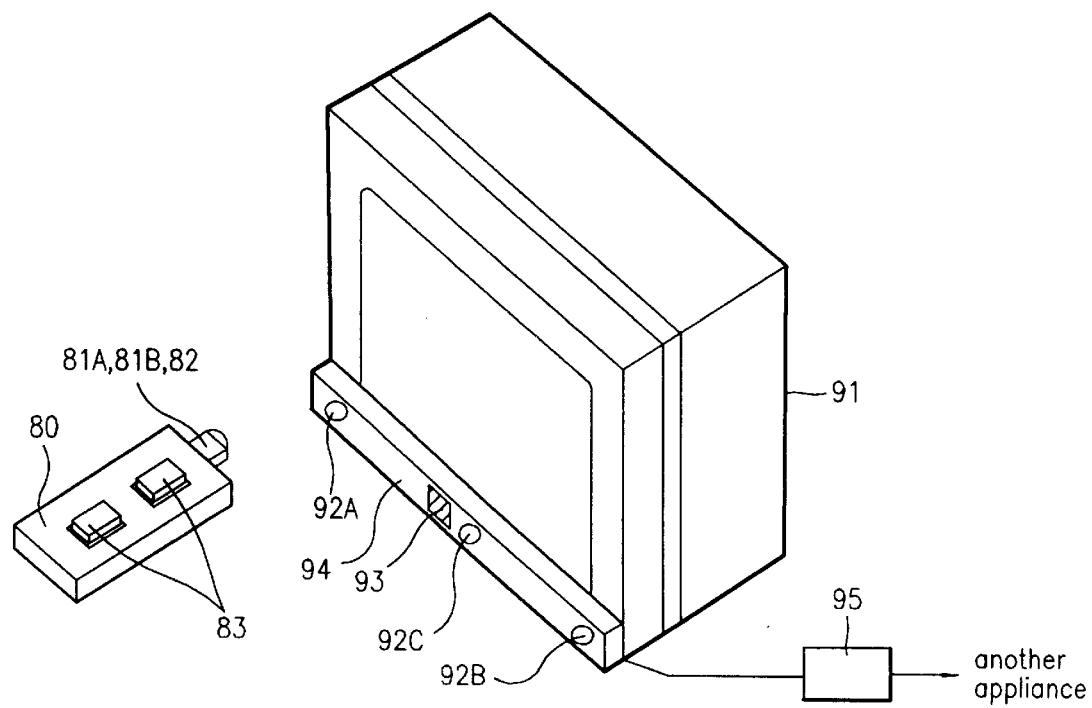

FIG. 12 illustrates a perspective view of a three dimensional wireless pointing device in accordance with a fifth embodiment of the present invention.

Referring to FIG. 12, the three dimensional wireless pointing device in accordance with the fifth embodiment of the present invention includes a separate sensor attachment device 94 for attaching infrared ray receiving sensors 92A, 92B and 92C and an ultrasonic wave receiving sensor 93 for receiving infrared ray(s) and ultrasonic wave signal(s) transmitted from a position pointing means 80, thereby the sensors 92A, 92B, 92C and 93 are attached, not on a display 91, but outside of the display 91 to form an external receiving part 95 like an adapter, which may be connected to another appliance.

As has been explained, the three dimensional wireless pointing device of the present invention, including the transmission side having the plurality of ultrasonic wave generating parts and a single infrared ray emitting part or a single ultrasonic wave generating part and the plurality of infrared ray emitting parts arranged on a certain axis direction at certain angles and a reception side having the plurality of infrared ray receiving sensors and a single ultrasonic wave receiving sensor arranged to cross the ultrasonic wave generating part(s) and the infrared ray emitting part(s) in the transmission side at a right angle, thereby to measure intensities of the infrared ray(s) and the ultrasonic wave(s) varied depending on direction of pointing and calculate a difference of relative traveling time periods of the infrared ray and the ultrasonic wave to obtain coordinate values of a position in a three dimensional space, whereby a position of cursor or menu, which is a control objective, can be controlled using the obtained coordinate values.

It will be apparent to those skilled in the art that various modifications and variations can be made in a three dimensional wireless pointing device of the present invention without departing from the spirit or scope of the invention. Thus, it is intended that the present invention cover the modifications and variations of this invention provided they come within the scope of the appended claims and their equivalents.

What is claimed is:

1. A three dimensional wireless pointing device comprising:

position pointing means having an infrared ray emitting part and a plurality of ultrasonic wave generating parts arranged in a predetermined axis direction at predetermined angles for emitting an infrared ray and generating a plurality of ultrasonic waves of different characteristics into a space;

detecting means having an ultrasonic wave receiving sensor and a plurality of infrared ray receiving sensors mounted on different positions on a straight line on a body of an electronic appliance to cross at a right angle to the infrared ray emitting part and the plurality of ultrasonic wave generating parts on the position pointing means for receiving the ultrasonic waves and the infrared signal transmitted from the position pointing means;

spatial position analyzing means for digitizing a plurality of infrared signals detected in the detecting means and detecting a relative phase difference of the ultrasonic waves with reference to a time when the infrared rays are detected;

coordinate calculating means for measuring intensities of the plurality of detected infrared rays digitized in the spatial position analyzing means in obtaining a first coordinate value, measuring intensities of the plurality of ultrasonic waves of different characteristics received at the ultrasonic wave receiving sensor with reference to the time when the infrared rays are detected by the infrared ray receiving sensors in obtaining a second coordinate value, and calculating an average traveling time of the ultrasonic waves with reference to the time when the infrared rays are detected by the infrared ray receiving sensors in obtaining a third coordinate value, thereby to determine a three dimensional relative position between the position pointing means and the detecting means; and, a position controlling means for taking the three dimensional position determined by the coordinate calculating means as the present position caused by a position movement of the position pointing means relative to the detecting means.

2. A device as claimed in claim 1, wherein the position pointing means includes, a key applying part having keys for moving a cursor, selection orders and operation orders, a periodic pulse generating part for receiving a key signal from the key applying part in generation of periodic pulses of a code identifying waveform and a synchronization identifying waveform, a signal producing part for overlapping the periodic pulse signal generated in the periodic pulse generating part with infrared, and ultrasonic carrier signals to convert into an infrared ray and a plurality of ultrasonic wave signals of different characteristics, a carrier generating part for generating an ultrasonic carrier signal and an infrared carrier signal and applying to the signal producing part during transmission of the ultrasonic waves and the infrared ray, and a plurality of signal generating parts having ultrasonic wave generating parts and an infrared ray emitting part for transmitting the ultrasonic wave signals of different characteristics and the infrared signal from the signal producing part into a space.

3. A device as claimed in claim 1, wherein the detecting means includes, the plurality of infrared ray receiving sensors mounted on different positions on a straight line each for receiving the infrared ray transmitted from the position pointing means, the ultrasonic wave receiving sensor mounted on a position different from the positions of the infrared ray receiving sensors on the same straight line for receiving the ultrasonic wave signals transmitted from the position pointing means, amplifying and filtering parts connected to the ultrasonic wave receiving sensor and the plurality of infrared ray receiving sensors respectively for amplifying the weak ultrasonic wave signal and the plurality of infrared signals received at the ultrasonic wave receiving sensor and the plurality of infrared ray receiving sensors respectively and passing carrier frequency bands only, and envelope detectors for removing carrier signals from outputs of the amplifying and filtering parts to detect intensity levels of the signals received at the ultrasonic wave receiving sensor and the infrared ray receiving sensors, respectively.

4. A device as claimed in claim 1, wherein the spatial position analyzing means includes, an analog-to-digital converter for digitizing outputs from the envelope detectors, each of which envelope detectors detects an envelope of one of the infrared ray signals received at the plurality of infrared ray receiving sensors, a first comparator for comparing an output of a predetermined envelope detector which detects the envelope of the infrared ray signal with an internal reference signal to convert into a timing signal for using the timing signal as a reference signal in coordinate calculation and code analyzing, a second comparator for comparing an output from the envelope detector which detects the envelope of the ultrasonic wave signal with an internal reference signal to convert into a timing signal, a phase difference detector for detecting a relative phase difference of the ultrasonic wave signal from the second comparator with reference to a time when the infrared ray from the first comparator is detected, and a clock generator for generating and applying clocks to the phase difference detector.

5. A device as claimed in claim 1, wherein the infrared ray emitting part and the plurality of ultrasonic wave generating parts in the position pointing means are arranged in an Y-axis direction at predetermined angles, and the ultrasonic wave receiving sensor and the plurality of infrared ray receiving sensors in the detecting means are mounted on a body of an electronic appliance in an X-axis direction spaced predetermined distances apart to cross the infrared ray emitting part and the plurality of ultrasonic wave generating parts in the position pointing means at a right angle.

6. A device as claimed in claim 1, wherein the ultrasonic wave generating part and the plurality of infrared ray emitting parts in the position pointing means are arranged in an X-axis direction at predetermined angles, and the infrared ray receiving sensor and the plurality of ultrasonic wave receiving sensors in the detecting means are mounted on the body of an electronic appliance in an Y-axis direction spaced predetermined distances apart to cross the ultrasonic wave generating part and the plurality of infrared ray emitting parts in the position pointing means at a right angle.

7. A device as claimed in claim 1, wherein the ultrasonic wave receiving sensor and the plurality of infrared ray receiving sensors in the detecting means are arranged in a system which can be detachable from the body of an electronic appliance.

8. A device as claimed in claim 1, wherein the position pointing means transmits ultrasonic waves of carrier frequencies different from one another on the same time.

9. A device as claimed in claim 1, wherein the position pointing means transmits ultrasonic waves of the same carrier frequency at timings different from one another.

10. A three dimensional wireless pointing device comprising:

position pointing means having an ultrasonic wave generating part and a plurality of infrared ray emitting parts arranged in a predetermined axis direction at predetermined angle for generating an ultrasonic wave signal and emitting a plurality of infrared ray signals of different characteristics into a space;

detecting means having an ultrasonic wave receiving sensor and a plurality of infrared ray receiving sensors mounted on a body of an electronic appliance at different positions on a straight line to cross at a right angle to the ultrasonic wave generating part and the plurality of infrared ray emitting parts in the position pointing means for receiving the ultrasonic wave signal and the infrared ray signals transmitted from the position pointing means;

spatial position analyzing means for digitizing the plurality of infrared signals detected in the detecting means and detecting a phase of the ultrasonic wave signal with reference to a time when the infrared rays are detected;

coordinate calculating means for measuring detected intensities of the plurality of infrared rays digitized in the spatial position analyzing means in obtaining a first coordinate value, measuring detected intensities of the plurality of infrared signals of different characteristics received at one of the plurality of infrared ray receiving sensors in obtaining a second coordinate value, and calculating an average traveling time of the ultrasonic waves with reference to the time when the infrared rays are detected by the infrared ray receiving sensors in obtaining a third coordinate value, thereby to determine a three dimensional relative position between the position pointing means and the detecting means; and, a position controlling means for taking the three dimensional position determined by the coordinate calculating means as the present position caused by a position movement of the position pointing means relative to the detecting means.

11. A device as claimed in claim 10, wherein the position pointing means includes, a key applying part having keys for moving a cursor, selection orders and operation orders, a periodic pulse generating part for receiving a key signal from the key applying part in generation of periodic pulses of a code identifying waveform and a synchronization identifying waveform, a signal producing part for overlapping the periodic pulse signal generated in the periodic pulse generating part with ultrasonic, and infrared carrier signals to convert into an ultrasonic wave signal and a plurality of infrared ray signals of different characteristics, a carrier generating part for generating an ultrasonic carrier signal and an infrared carrier signal and applying to the signal producing part during transmission of the ultrasonic wave signal and the infrared ray signals, and a signal generating part having the ultrasonic wave generating part and the plurality of infrared ray emitting parts for transmitting the ultrasonic wave signal and the plurality of infrared ray signals of different characteristics from the signal producing part into a space.

12. A device as claimed in claim 10, wherein the detecting means includes, the plurality of infrared ray receiving sensors mounted on different positions on a straight line each for receiving the infrared ray transmitted from the position pointing means, the ultrasonic wave receiving sensor mounted on a position different from the positions of the infrared ray receiving sensors on the same straight line for receiving the ultrasonic wave signals transmitted from the position pointing means, amplifying and filtering parts connected to the ultrasonic wave receiving sensor and the plurality of infrared ray receiving sensors respectively for amplifying the weak ultrasonic wave signal and the plurality of infrared signals received at the ultrasonic wave receiving sensor and the plurality of infrared ray receiving sensors respectively and passing carrier frequency bands only, and envelope detectors for removing carrier signals from outputs of the amplifying and filtering parts to detect intensity levels of the signals received at the ultrasonic wave receiving sensor and the infrared ray receiving sensors, respectively.

13. A device as claimed in claim 10, wherein the spatial position analyzing means includes, an analog-to-digital converter for digitizing outputs from the envelope detectors, each of which envelope detectors detects an envelope of one of the infrared ray signals received at the plurality of infrared ray receiving sensors, a first comparator for comparing an output of a predetermined envelope detector which detects the envelope of the infrared ray signal with an internal reference signal to convert into a timing signal for using the timing signal as a reference signal in coordinate calculation and code analyzing, a second comparator for comparing an output from the envelope detector which detects the envelope of the ultrasonic wave signal with an internal reference signal to convert into a timing signal, a phase difference detector for detecting a relative phase difference of the ultrasonic wave signal from the second comparator with reference to a time when the infrared ray from the first comparator is detected, and a clock generator for generating and applying clocks to the phase difference detector.

14. A device as claimed in claim 10, wherein the coordinate calculating means measures intensifies of infrared ray signals detected by the plurality of infrared ray receiving sensors of the infrared ray signal transmitted through one of the infrared ray emitting parts in the position pointing means to calculate a first coordinate value and, after a predetermined time interval, measures intensities of infrared ray signals detected by the plurality of infrared ray receiving sensors of the infrared ray signal transmitted through the other one of the infrared ray emitting parts in the position pointing means to calculate another first coordinate value, and averaging the calculated first coordinate values to calculate a final first coordinate value.

15. A device as claimed in claim 14, wherein the first coordinate value is an X-axis coordinate value.

16. A device as claimed in claim 10, wherein the ultrasonic wave generating part and the plurality of infrared ray emitting parts in the position pointing means are arranged in an Y-axis direction at predetermined angles, and the ultrasonic wave receiving sensor and the plurality of infrared ray receiving sensors in the detecting means are mounted on a body of an electronic appliance in an X-axis direction spaced predetermined distances apart to cross the ultrasonic wave generating part and the plurality of infrared ray emitting parts in the position pointing means at a right angle.

17. A device as claimed in claim 10, wherein the ultrasonic wave generating part and the plurality of infrared ray emitting parts in the position pointing means are arranged in an X-axis direction at predetermined angles, and the ultrasonic wave receiving sensor and the plurality of infrared ray receiving sensors in the detecting means are mounted on the body of an electronic appliance in an Y-axis direction spaced predetermined distances apart to cross the ultrasonic wave generating part and the plurality of infrared ray emitting parts in the position pointing means at a right angle.

18. A device as claimed in claim 10, wherein the ultrasonic wave receiving sensor and the plurality of infrared ray receiving sensors in the detecting means are arranged in a system which can be detachable from the body of an electronic appliance.

19. A device as claimed in claim 10, wherein the plurality of infrared ray emitting parts in the position pointing means are arranged at positions different from one another and emit infrared rays of carrier frequencies different from one another on the same time.

20. A device as claimed in claim 10, wherein the plurality of infrared ray emitting parts in the position pointing means are arranged at positions different from one another and emit infrared rays of a same carrier frequency at timings different from one another.

21. A device as claimed in claim 10, wherein the plurality of infrared ray emitting parts in the position pointing means are arranged at positions different from one another, one of which emits a longitudinal infrared ray and the other one of which transmits a transverse infrared ray, separately.

22. A device as claimed in claim 10, wherein the plurality of infrared ray emitting parts in the position pointing means are arranged at positions different from one another, and emit infrared rays of wavelengths different from one another.

* * * * *